United States Patent
Hsu et al.

(10) Patent No.: US 9,338,717 B2
(45) Date of Patent: May 10, 2016

(54) METHODS AND APPARATUS FOR INCREASING EMERGENCY CALL SUCCESS RATE BY REDUCING RETRIES IN THE SAME DOMAIN

(71) Applicant: QUALCOMM Incorporated, San Diego, CA (US)

(72) Inventors: Cherng-Shung Hsu, San Diego, CA (US); Stephen William Edge, Escondido, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 13/914,223

(22) Filed: Jun. 10, 2013

(65) Prior Publication Data

US 2014/0024331 A1   Jan. 23, 2014

Related U.S. Application Data

(60) Provisional application No. 61/673,665, filed on Jul. 19, 2012.

(51) Int. Cl.
*H04W 36/28* (2009.01)
*H04W 4/22* (2009.01)
*H04W 76/00* (2009.01)
*H04W 88/06* (2009.01)

(52) U.S. Cl.
CPC .............. *H04W 36/28* (2013.01); *H04W 4/22* (2013.01); *H04W 76/007* (2013.01); *H04W 88/06* (2013.01)

(58) Field of Classification Search
CPC .................................................. H04W 36/28
See application file for complete search history.

(56) References Cited

U.S. PATENT DOCUMENTS

| | | | |
|---|---|---|---|
| 2008/0102784 | A1 | 5/2008 | Mittal et al. |
| 2010/0113010 | A1 | 5/2010 | Tenny et al. |
| 2010/0248731 | A1 | 9/2010 | Hsieh et al. |
| 2010/0297979 | A1 | 11/2010 | Watfa et al. |
| 2011/0076982 | A1 | 3/2011 | Li et al. |
| 2012/0002545 | A1* | 1/2012 | Watfa et al. ............... 370/235 |
| 2012/0236760 | A1* | 9/2012 | Ionescu et al. ............ 370/259 |

OTHER PUBLICATIONS

3GPP: "3rd Generation Partnership Project; Technical Specification Group Core Network and Terminals; Non-Access-Stratum (NAS) protocol for Evolved Packet System (EPS); Stage 3 (Release 11)", 3GPP Standard; 3GPP TS 24.301, 3rd Generation Partnership Project (3GPP), Mobile Competence Centre ; 650, Route Des Lucioles ; F-06921 Sophia-Antipolis Cedex, France, vol. CT WG1, No. V11.3.0, Jun. 25, 2012, pp. 1-335, XP050580815, [retrieved on Jun. 25, 2012].
International Search Report and Written Opinion—PCT/US2013/045133—ISA/EPO—Nov. 8, 2013.

* cited by examiner

*Primary Examiner* — Mazda Sabouri
(74) *Attorney, Agent, or Firm* — Patterson & Sheridan, L.L.P.

(57) ABSTRACT

Certain aspects of the present disclosure relate to techniques for increasing the emergency call success rate by reducing the number of retries in a same domain. According to one aspect, a multi-mode user equipment may measure a first time period upon a first attempt of establishing an emergency call in a first RAT network. The UE may use a configurable parameter to determine a number of times that the UE may retry the emergency call in the first RAT network after expiration of the first time period without establishing the emergency call or after a failed attempt of the emergency call during the first time period. The UE may switch to a second RAT network if the UE fails in establishing the emergency call in the first RAT network after retrying the determined number of times.

72 Claims, 9 Drawing Sheets

(a) Generic architecture: switching to other domains if emergency call attempt fails on one domain (b) Switching between wireless networks architecture example (c) Switching from wireless-line architecture example

METHODS AND APPARATUS FOR INCREASING EMERGENCY CALL SUCCESS RATE BY REDUCING RETRIES IN THE SAME DOMAIN

CROSS-REFERENCE TO RELATED APPLICATIONS

This application claims benefit of U.S. Provisional Patent Application Ser. No. 61/673,665, filed 19 Jul. 2012, which is expressly incorporated by reference herein in its entirety.

BACKGROUND

1. Field

Aspects of the present disclosure relate generally to wireless communication systems, and more particularly, apparatus and techniques for increasing the success rate for making an emergency call by reducing the number of retries in the same domain.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system. To efficiently transmit and receive information, signals are usually encoded into a special format before transmission and decoded by a receiver after reception. Numerous encoding and decoding methods exist, with each presenting advantages and challenges, as well.

The 3GPP LTE represents a major advance in cellular technology and it is a next step forward in cellular $3^{rd}$ generation (3G) services as a natural evolution of Global System for Mobile Communications (GSM) and Universal Mobile Telecommunications System (UMTS). The LTE provides for an uplink speed of up to 75 megabits per second (Mbps) and a downlink speed of up to 300 Mbps, and brings many technical benefits to cellular networks. The LTE is designed to meet carrier needs for high-speed data and media transport as well as high-capacity voice support. The bandwidth may be scalable from 1.25 MHz to 20 MHz. This suits the requirements of different network operators that have different bandwidth allocations, and also allows operators to provide different services based on spectrum. The LTE is also expected to improve spectral efficiency in 3G networks, allowing carriers to provide more data and voice services over a given bandwidth.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses OFDMA on the downlink and Single Carrier-Frequency Division Multiple Access (SC-FDMA) on the uplink. OFDMA allows data to be directed to or from multiple users on a subcarrier-by-subcarrier basis for a specified number of symbol periods.

SUMMARY

In an aspect of the disclosure, a method for wireless communications is provided. The method generally includes measuring a first time period upon a first attempt of establishing an emergency call in a first radio access technology (RAT) network, using a configurable parameter to determine a number of times the UE may retry the emergency call in the first RAT network after expiration of the first time period without establishing the emergency call or after a failed attempt of the emergency call during the first time period, and switching to a second RAT network if the UE fails in establishing the emergency call in the first RAT network after retrying the determined number of times.

In an aspect of the disclosure, a multi-mode user equipment (UE) for wireless communications is provided. The multi-mode UE generally includes means for measuring a first time period upon a first attempt of establishing an emergency call in a first radio access technology (RAT) network, means for using a configurable parameter to determine a number of times the UE may retry the emergency call in the first RAT network after expiration of the first time period without establishing the emergency call or after a failed attempt of the emergency call during the first time period, and means for switching to a second RAT network if the UE fails in establishing the emergency call in the first RAT network after retrying the determined number of times.

In an aspect of the disclosure, an apparatus for wireless communications by a multi-mode user equipment (UE) is provided. The apparatus generally includes at least one processor and a memory coupled to the at least one processor. The at least one processor is generally configured to measure a first time period upon a first attempt of establishing an emergency call in a first radio access technology (RAT) network, use a configurable parameter to determine a number of times the UE may retry the emergency call in the first RAT network after expiration of the first time period without establishing the emergency call or after a failed attempt of the emergency call during the first time period, and switch to a second RAT network if the UE fails in establishing the emergency call in the first RAT network after retrying the determined number of times.

In an aspect of the disclosure, a computer-program product for wireless communications by a multi-mode user equipment (UE) is provided. The computer-program product generally comprises a non-transitory computer-readable medium having code stored thereon, the code executable by one or more processors for measuring a first time period upon a first attempt of establishing an emergency call in a first radio access technology (RAT) network, using a configurable parameter to determine a number of times the UE may retry the emergency call in the first RAT network after expiration of the first time period without establishing the emergency call or after a failed attempt of the emergency call during the first time period, and switching to a second RAT network if the UE fails in establishing the emergency call in the first RAT network after retrying the determined number of times.

DETAILED DESCRIPTION

Aspects of the present disclosure relate to methods and apparatus for increasing the success rate in making an emergency call, at least in part, by reducing the number of retries in a same domain (e.g., Radio Access Technology (RAT) network). According to aspects, a multi-mode UE measures a first time period upon a first attempt of establishing an emergency call in a first radio RAT network. The UE may use a configurable parameter to determine a number of times that it may retry the emergency call in the first RAT network after expiration of the first time period without establishing the emergency call or after a failed attempt of the emergency call during the first time period. If the UE fails in establishing the call in the first RAT network after retrying the determined number, the UE may switch to a second RAT network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, a mobile unit, a wireless unit, a remote unit, a mobile device, a wireless device, a wireless communication device, a remote device, a mobile subscriber station, a mobile terminal, a wireless terminal, a handset, a mobile client, a client, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Figure 1:
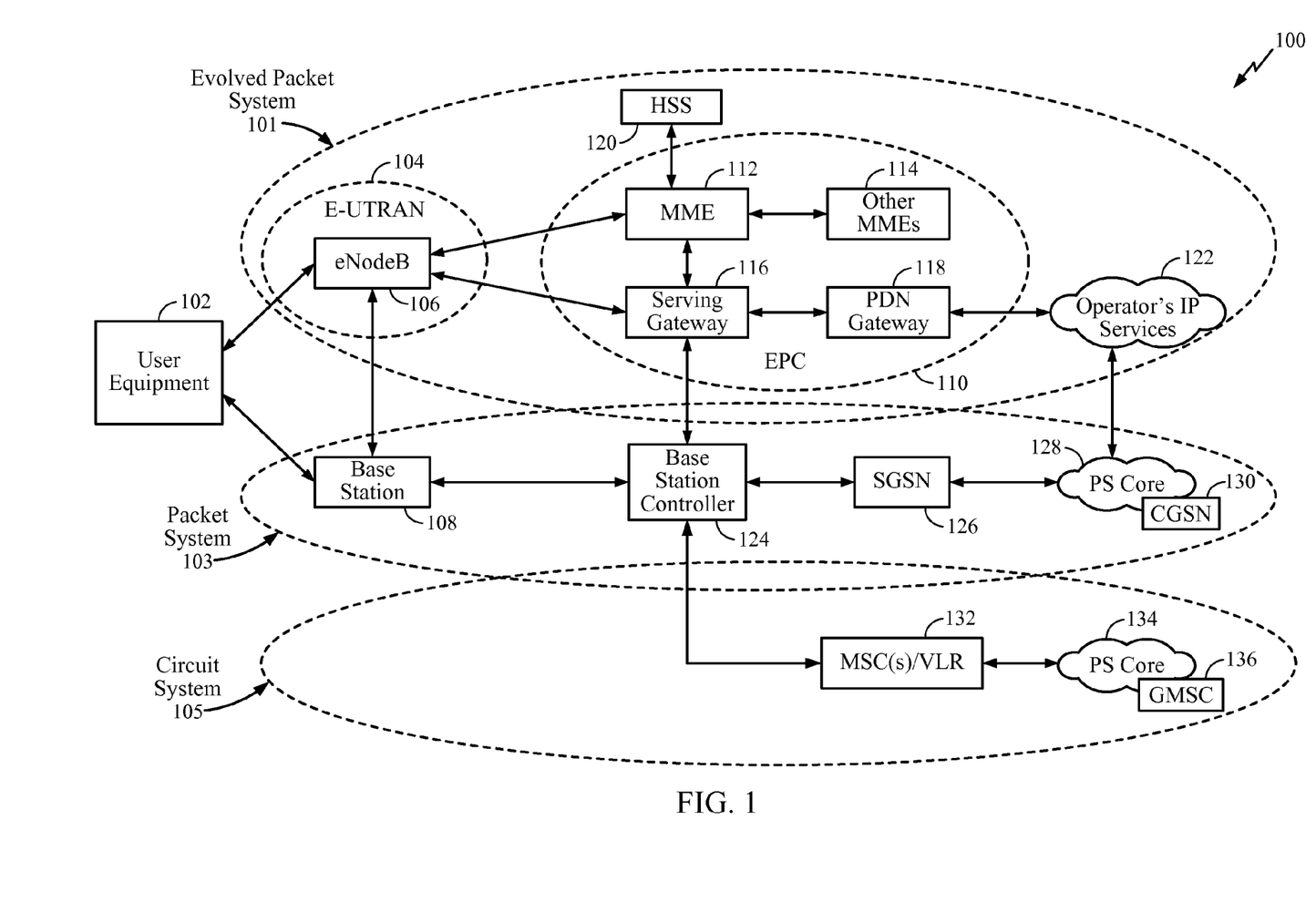
FIG. 1 shows a diagram illustrating a wireless communication network, in accordance with certain aspects of the present disclosure.

FIG. 1 shows a diagram illustrating a wireless network architecture 100 employing various apparatuses, in accordance with aspects of the disclosure. The network architecture 100 may include an Evolved Packet System (EPS) 101. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS may interconnect with other access networks, such as a packet switched core (PS core) 128, a circuit switched core (CS core) 134, etc. As shown, the EPS provides packet-switched services, however, as those skilled in the art will readily appreciate, the various concepts presented throughout this disclosure may be extended to networks providing circuit-switched services, such as the network associated with CS core 134.

The network architecture 100 may further include a packet switched network 103 and/or a circuit switched network 105. In one aspect, the packet switched network 103 may include base station 108, base station controller 124, Serving GPRS Support Node (SGSN) 126, PS core 128 and Combined GPRS Service Node (CGSN) 130. In another aspect, the circuit switched network 105 may include base station 108, base station controller 124, Mobile services Switching Centre (MSC), Visitor location register (VLR) 132, CS core 134 and Gateway Mobile Switching Centre (GMSC) 136.

The E-UTRAN may include an evolved Node B (eNB) 106 and connection to other networks, such as packet and circuit switched networks may be facilitated through base station 108. The eNB 106 provides user and control plane protocol terminations toward the UE 102. The eNB 106 may be connected to the other eNBs 108 via an X2 interface (i.e., backhaul). The eNB 106 may also be referred to by those skilled in the art as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 include the Internet, the Intranet, an IP Multimedia Subsystem (IMS), and a PS Streaming Service (PSS).

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
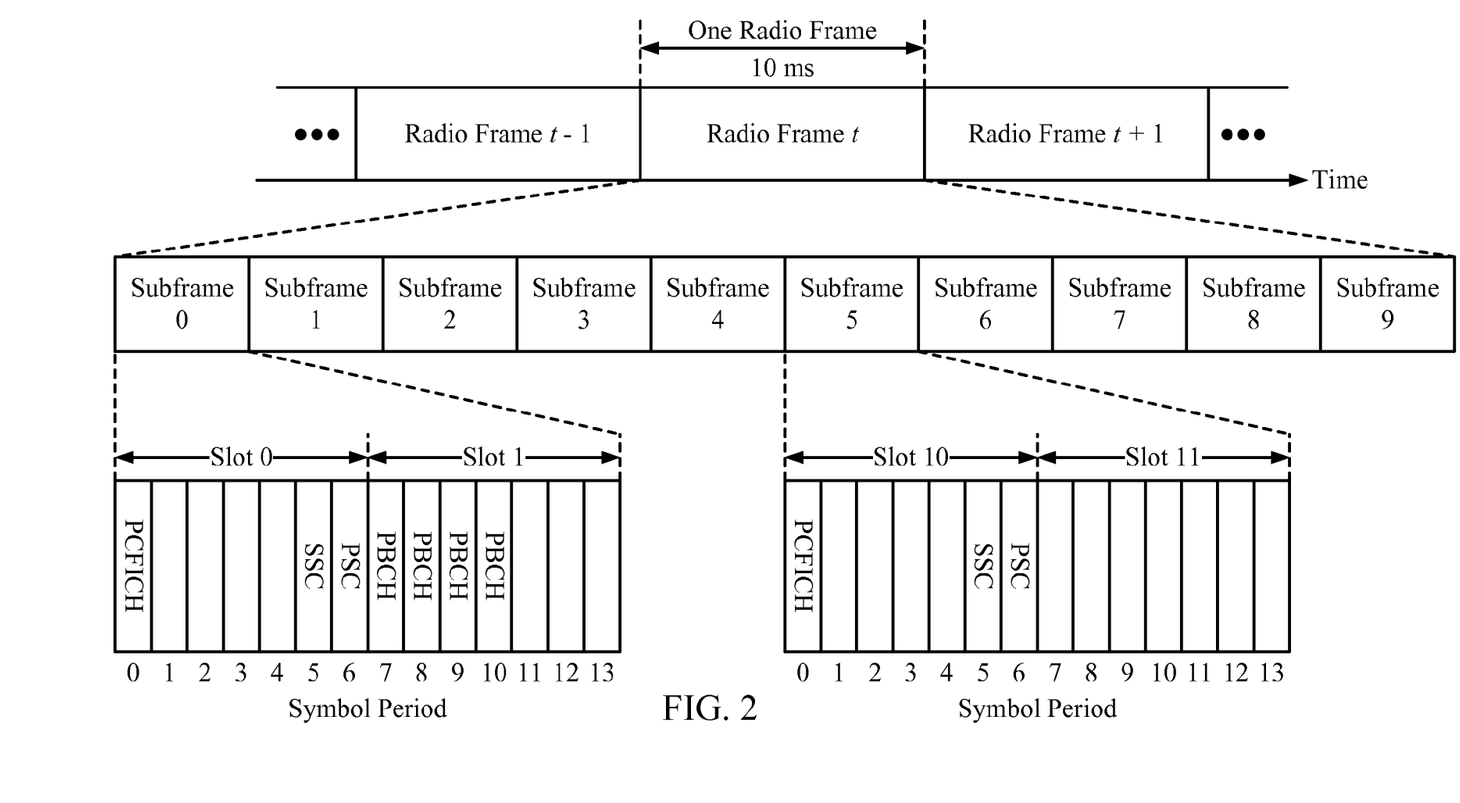
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, for example, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
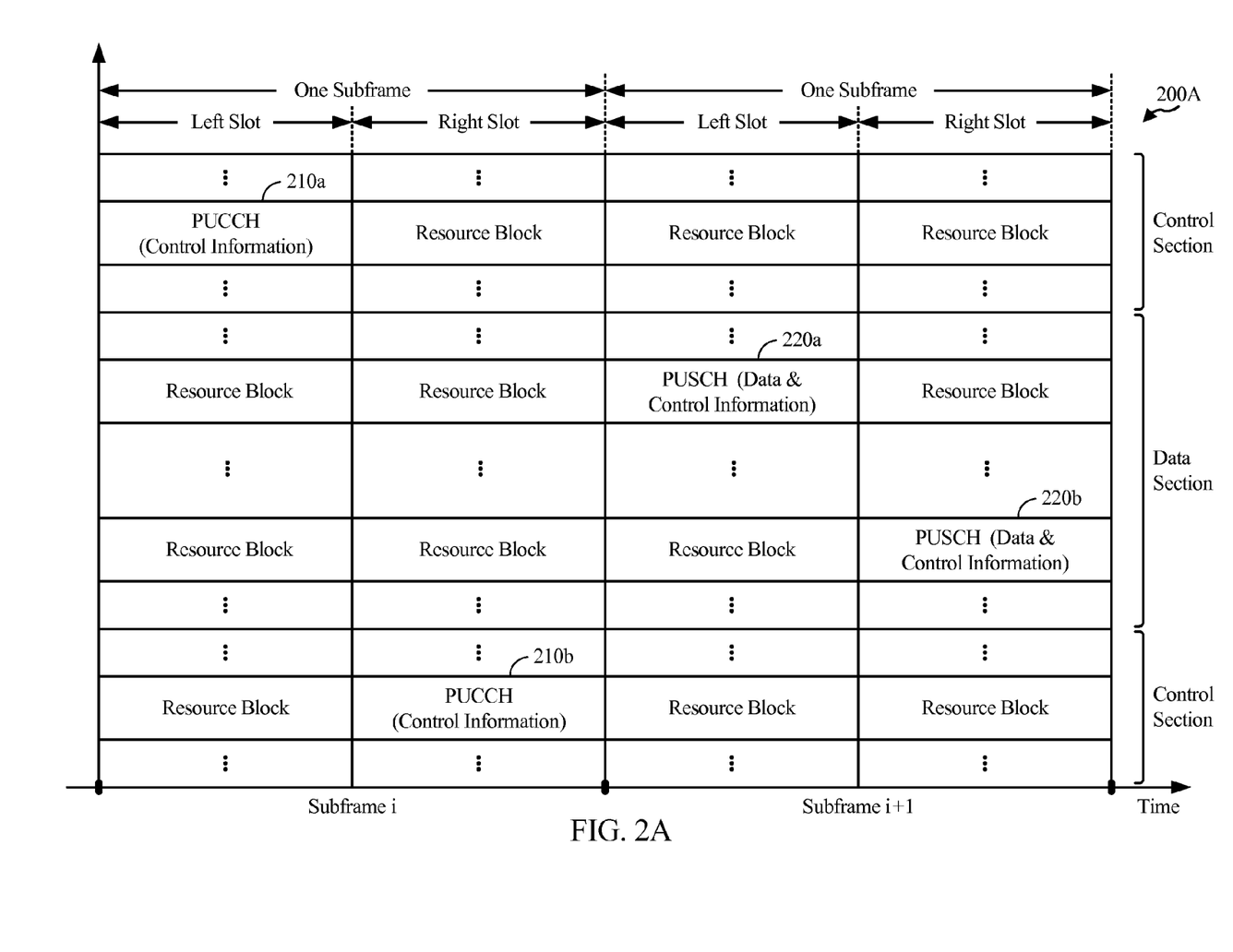
FIG. 2A illustrates an example uplink frame structure in Long Term Evolution (LTE) in accordance with certain aspects of the present disclosure.

FIG. 2A illustrates an exemplary frame structure 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

The PSS, SSS, CRS, PBCH, PUCCH and PUSCH in LTE are described in 3GPP TS 36.211, entitled, "Evolved Universal Terrestrial Radio Access (E-UTRA); Physical Channels and Modulation," which is publicly available.

Figure 3:
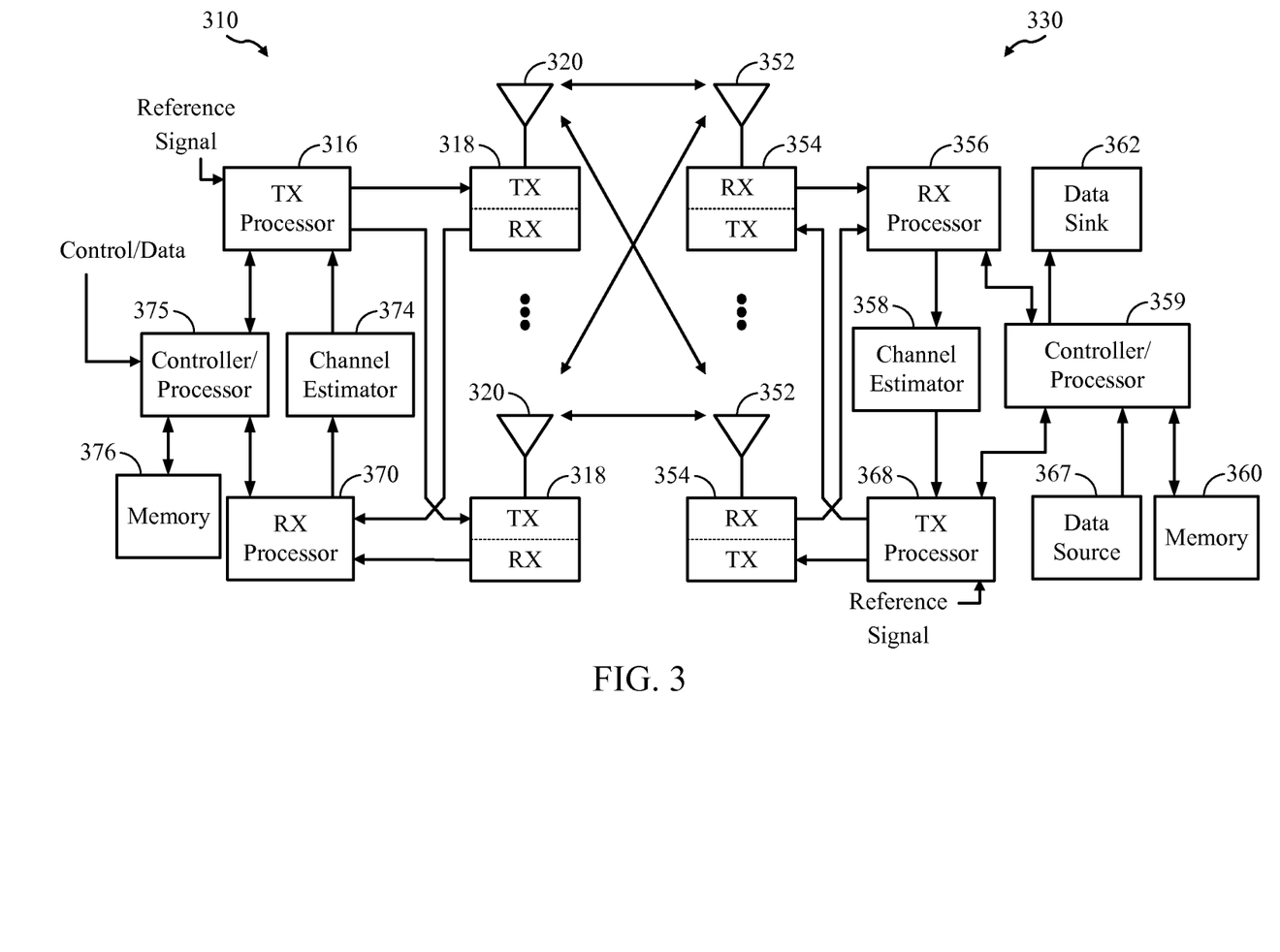
FIG. 3 illustrates a block diagram of an eNB in communication with a UE in an access network, in accordance with aspects of the present disclosure.

FIG. 3 is a block diagram of an eNB 310 in communication with a UE 350 in an access network. According to aspects of the present disclosure, UE 350 may be a multi-mode UE. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The TX processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receiver (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the control/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

As will be described in more detail herein, a controller/processor 359 of a multi-mode UE 350 may perform operations in an effort to increase the success rate for making an emergency call. According to an aspect of the present disclosure, controller/processor 359 of a multi-mode UE 350 may measure a first time period upon a first attempt of establishing an emergency call in a first RAT network. The controller/processor 359 may direct the UE to use a configurable parameter to determine a number of times the UE may retry the emergency call in the first RAT network after expiration of the first time period without establishing the emergency call or after a failed attempt of the emergency call during the first time period. The controller/processor 359 may direct the UE to switch to a second RAT network to attempt the emergency call if the UE fails in establishing the emergency call in the first RAT network after retrying the determined number of times. However, additional and/or different components from FIG. 3 may be employed to perform the operations in an effort to increase the success rate for making an emergency call.

Increasing Emergency Call Success Rate by Reducing Retries in the Same Domain

Call attempts after a disaster may overload a mobile network. The rate of call set up success is an important concern for making an emergency call during an overloaded network scenario.

The following two Internet Protocol Multimedia Subsystem (IMS) emergency call related sequence of events are specified in 3GPP TS23.401, TS24.301, TS24.229, and TS23.167.

For a normal attached UE (e.g., via LTE), a successful sequence of events may include, for example:
1. A multi-mode UE performing a normal attach procedure (e.g., network attach phase),
2. A user placing an IMS emergency call (if selection decision is based on H.5 of TS23.167),
3. The UE initiating a UE-requested packet data network (PDN) connectivity to set up an emergency PDN connection (e.g., emergency PDN connection establishment phase),
4. The UE performing an IMS emergency registration procedure (e.g., IMS emergency registration phase), and
5. The IMS emergency session being set up (e.g., call setup phase).

For a Limited Service Mode (LSM) UE, a successful sequence of events may include, for example:
1. The user placing an IMS emergency call (e.g., if the UE is camped on LTE),
2. The UE performing an emergency attach procedure (e.g., including emergency PDN connectivity setup) without IMS emergency registration (e.g., network attach phase), and
3. The UE setting up the IMS emergency session (e.g., call setup phase).

According to 3GPP TS22.101, the UE may attempt an emergency call in a first domain. If the attempt fails, the UE may try to place the emergency call in another domain. In an overloaded network scenario, many emergency call setups may fail in the network attach phase (e.g., Step 1 for a normal attached UE and Step 2 for a LSM UE).

Figure 4:
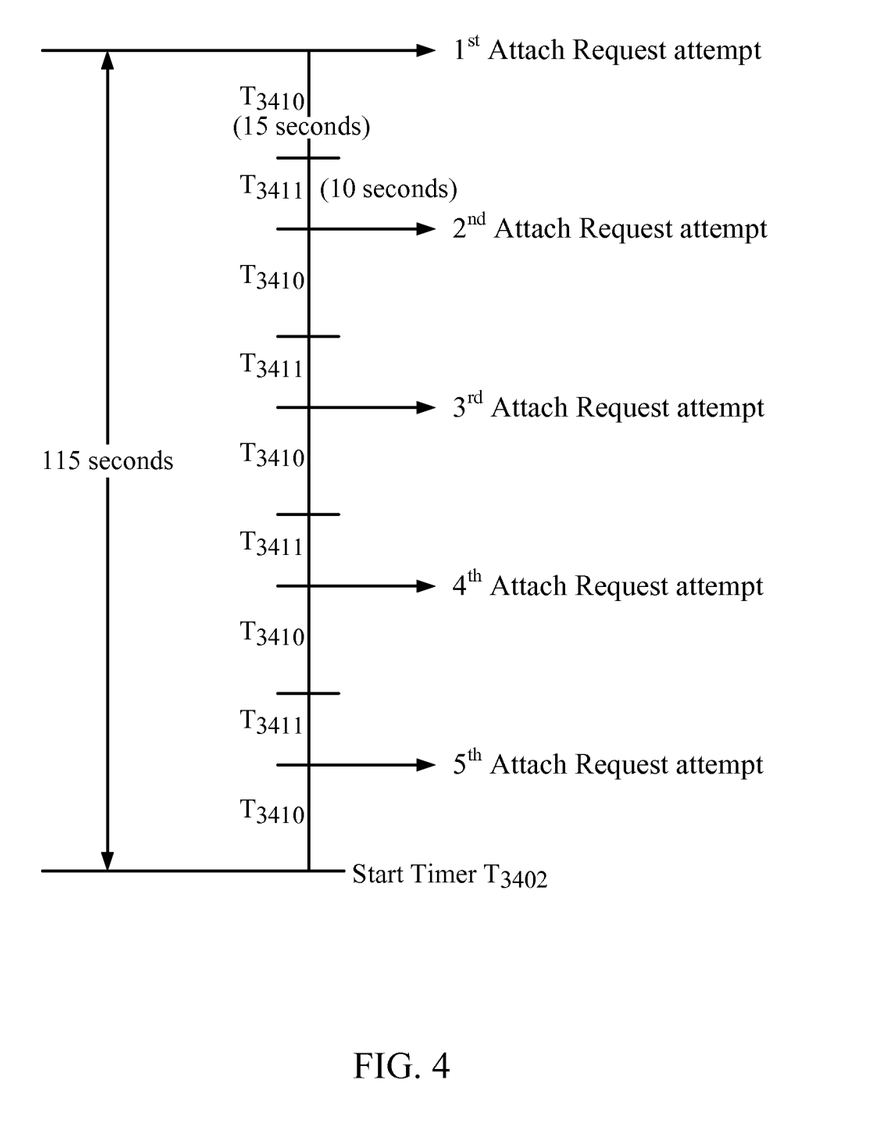
FIG. 4 illustrates an example maximum total duration for an attach procedure to claim attach failure, according to aspects of the present disclosure.

FIG. 4 illustrates a maximum duration for an entire attach procedure according to 3GPP TS24.301. The attach procedures for normal attach and emergency attach requires performing attach attempts for up to four retries via the LTE network. As shown in FIG. 4, the attach procedure, which includes five $T_{3410}$ timeout durations and four $T_{3411}$ timeout durations, may last 115 seconds. According 3GPP TS24.301, after the 115 second attach attempt duration, timer $T_{3402}$ is started for another 12 minute backoff period.

Even if the user equipment has successfully attached to the network, the call set up may fail during emergency call setup phase (e.g., Step 5 for a normal attached UE and Step 3 for a LSM UE). For example, for an LSM UE, the UE may send a Session Initiated Protocol (SIP) Invite request message up to the maximum number of allowed times. Accordingly, during an overloaded network scenario, the device may attempt to set up the emergency call in the same domain for an unnecessary amount of time.

Aspects of the present disclosure provide techniques to increase the success rate for making an emergency call by reducing the retries, for example, during an attach phase and/or a call setup phase. While aspects are described with respect to reducing the number of retries for the attach and/or call setup phase, one of skill in the art would understand that similar techniques may be applied to other procedures involved in establishing an emergency call, including, for example, a UE requesting PDN connectivity in an effort to set up an emergency PDN connection and/or a UE performing IMS emergency registration procedures.

Figure 5:
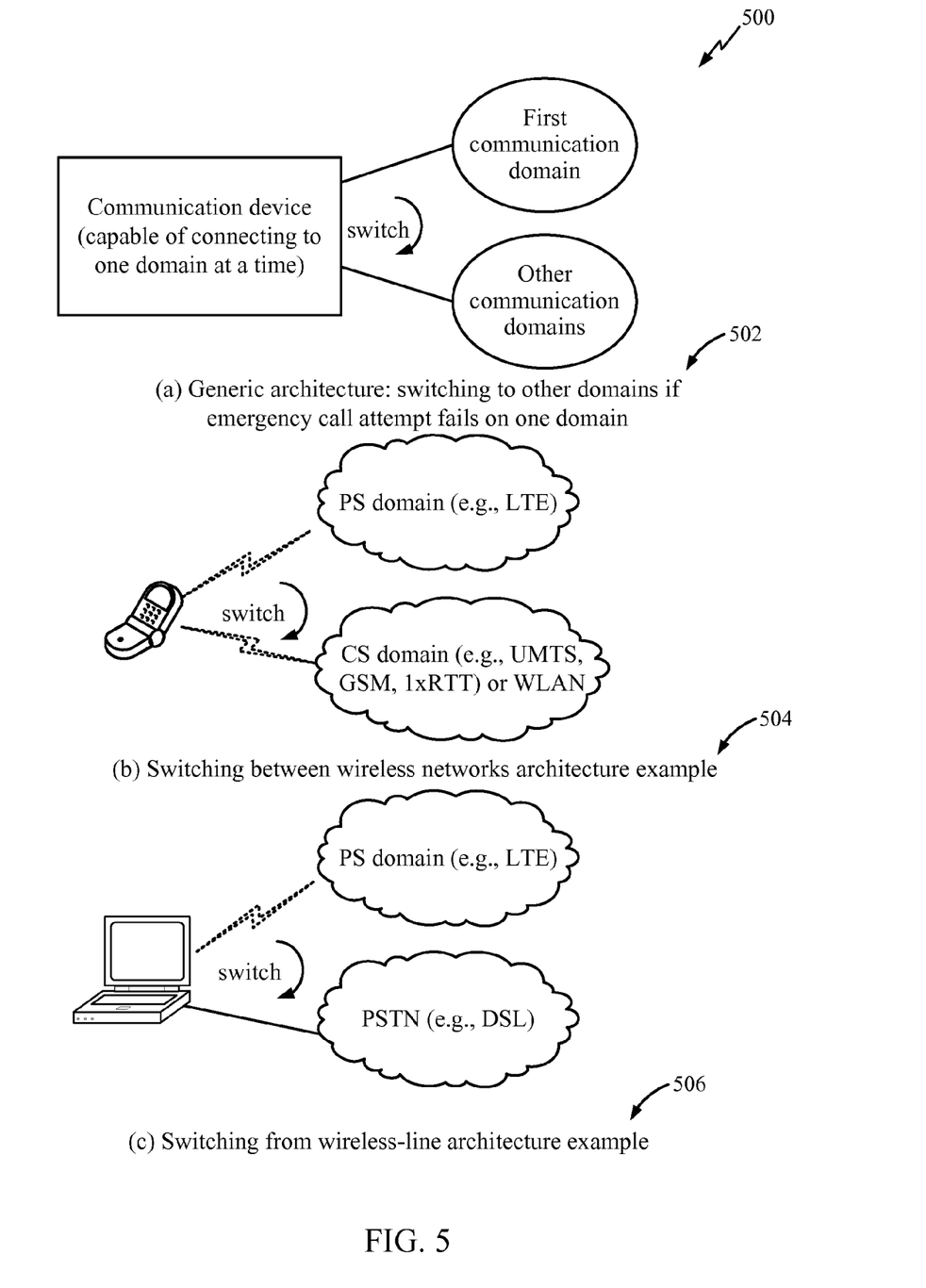
FIG. 5 illustrates examples of communication architectures, according to aspects of the present disclosure.

FIG. 5 illustrates example communication architectures 500 in which a multi-mode UE may increase the success rate in making an emergency call, according to aspects of the present disclosure.

According to a first communication architecture 502, a UE, such as multi-mode UE 350 of FIG. 3 may be capable of connecting to one domain at a time. The UE may communicate in a first domain and may be capable of switching to another communication domain.

According to a second communication architecture 504, a UE, such as multi-mode UE 350 of FIG. 3 may switch between wireless networks. For example, and as described with reference to FIG. 1, the UE may switch between a PS domain (e.g., packet system 103) and a CS domain (e.g., circuit system 105).

According to a third communication architecture, 506, a UE, such as multi-mode UE 350 of FIG. 3 may switch from a wireless to wire-line architecture. For example, the UE may switch between a PS domain to a public switched telephone network (PSTN).

Based on collected performance data, the attach procedure for an emergency call usually takes less than 2 seconds over a normally loaded network. If a device (e.g., multi-mode UE) does not receive a response from the network in more than 10 times this value, the network may be overloaded or out of service temporarily (e.g., due to the access network or the core network). After the second timeout (e.g., two $T_{3410}$ timeouts plus one $T_{3411}$ timeout), the device may benefit from switching to another available domain to try to receive emergency services rather than reattempting the emergency call setup over the same domain.

Even if the device has attached to the network successfully, the call set up may fail during an emergency session setup phase. During the IMS emergency call setup, for example, according to aspects of the present disclosure, the device may reduce the number of retries without achieving the required maximum number of retries for normal calls. The number of emergency call setup attempts may be limited to one (e.g., zero retries) or two times (e.g., one retry). According to aspects, a different number of attempts may be employed. In addition to increasing the emergency call setup rate, the time to set up an emergency call may be reduced due to the early switching from one domain to another domain on which the emergency services may be more readily available.

Figure 6:
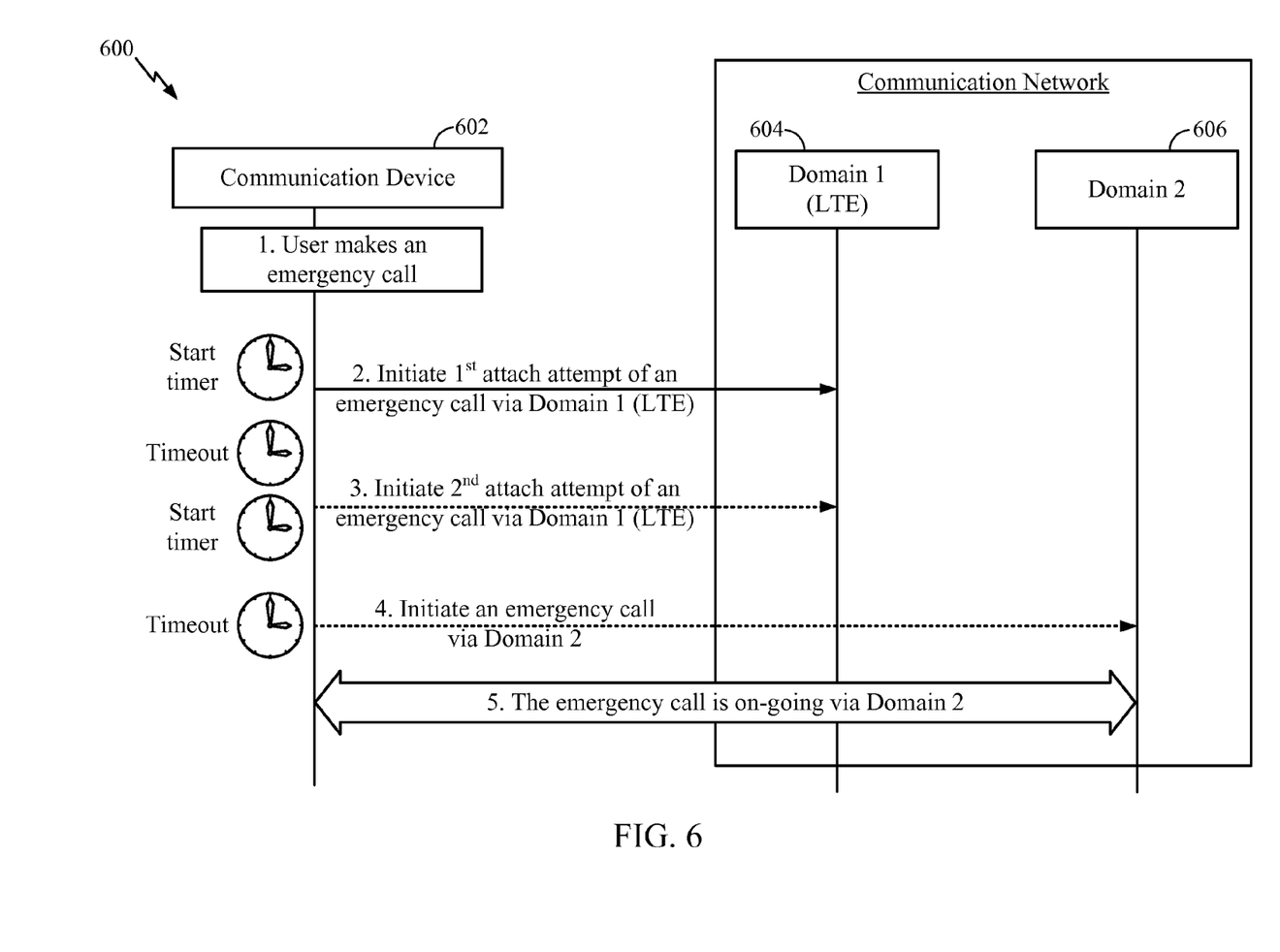
FIG. 6 illustrates an example of reducing a number of attach attempts during an attach phase when making an emergency call, according to aspects of the present disclosure.

FIG. 6 illustrates an example call-flow diagram 600 for reducing a number of attach attempts during an emergency call, according to aspects of the present disclosure. The communication device 602 (e.g., multi-mode UE 350 of FIG. 3) may be capable of making an emergency call over two or more communication domains 604 and 606 (e.g., PS domain via LTE network, CS domain via UMTS, GSM or 1×RTT and/or DSL via PSTN). The communication device 602 may be camped on one communication domain 604 (e.g., LTE). In an overloaded network scenario, however, the device may not be successfully attached to the network.

At Step 1, the communication device may make an emergency call. As noted above, the device may not be successfully attached to the communication network. At Step 2, the device may need to initially attach to the communication network according to 3GPP TS23.401. If the device 602 is in a limited service state, the device may also need to perform an emergency attach procedure (per TS23.401) before establishing the emergency session with the network. The device 602 may initiate a first attach attempt via Domain 1 604 (LTE) and begin measuring a first time period. For example, the UE may start a first timer to measure the first time period.

The first time period may be set to a value of $T_{3410}$ plus $T_{3411}$. According to aspects of the present disclosure, the device may use two timers to measure the first time period. However, a larger or smaller number of timers may be employed. The UE may start a $T_{3410}$ timer first. If the $T_{3410}$ timer expires, the device may start a $T_{3411}$ timer.

At Step 3, the first attach attempt via Domain 1 604 may fail, due to a timeout. The communication device 602 may measure a second time period upon a first retry of the emergency call in Domain 1 604. For example, the UE may initiate a second timer to measure the second time period. The second period may equal to or different than the first time period. According to aspects, the second time period may be set to a value based on the $T_{3410}$ timer. However, the second time period may be based on a larger or smaller number of timers. As will be explained in more detail below, a configurable parameter may indicate the number of times a UE may retry the emergency call setup (e.g., attach attempt) in Domain 1 604 after expiration of the first time period.

At Step 4, the second attach attempt via Domain 1 604 may fail due to expiration of the second time period. If the configurable parameter indicates that the UE may retry the attach attempt one time in the Domain 1 604, the communication device 602 may switch to another available domain, for example Domain 2 606, to attempt the emergency call set up procedure.

At Step 5, the emergency call set up may be successful via Domain 2 606. Accordingly, the emergency call may be on-going via Domain 2.

According to aspects of the present disclosure, if, in Step 4, the device fails in attempting the emergency call set up via Domain 2, it may switch to another available domain (e.g., not illustrated) to make the call.

As described above, the number of times a communication device retries the emergency call in a domain may be governed by a configurable parameter. The configurable parameter may be based on emergency call setup time deployment requirements. As described with reference to FIG. 6, the communication device may be configured to retry the emergency call any number of times, including zero or one time, in the first domain before switching to another available domain.

Figure 7:
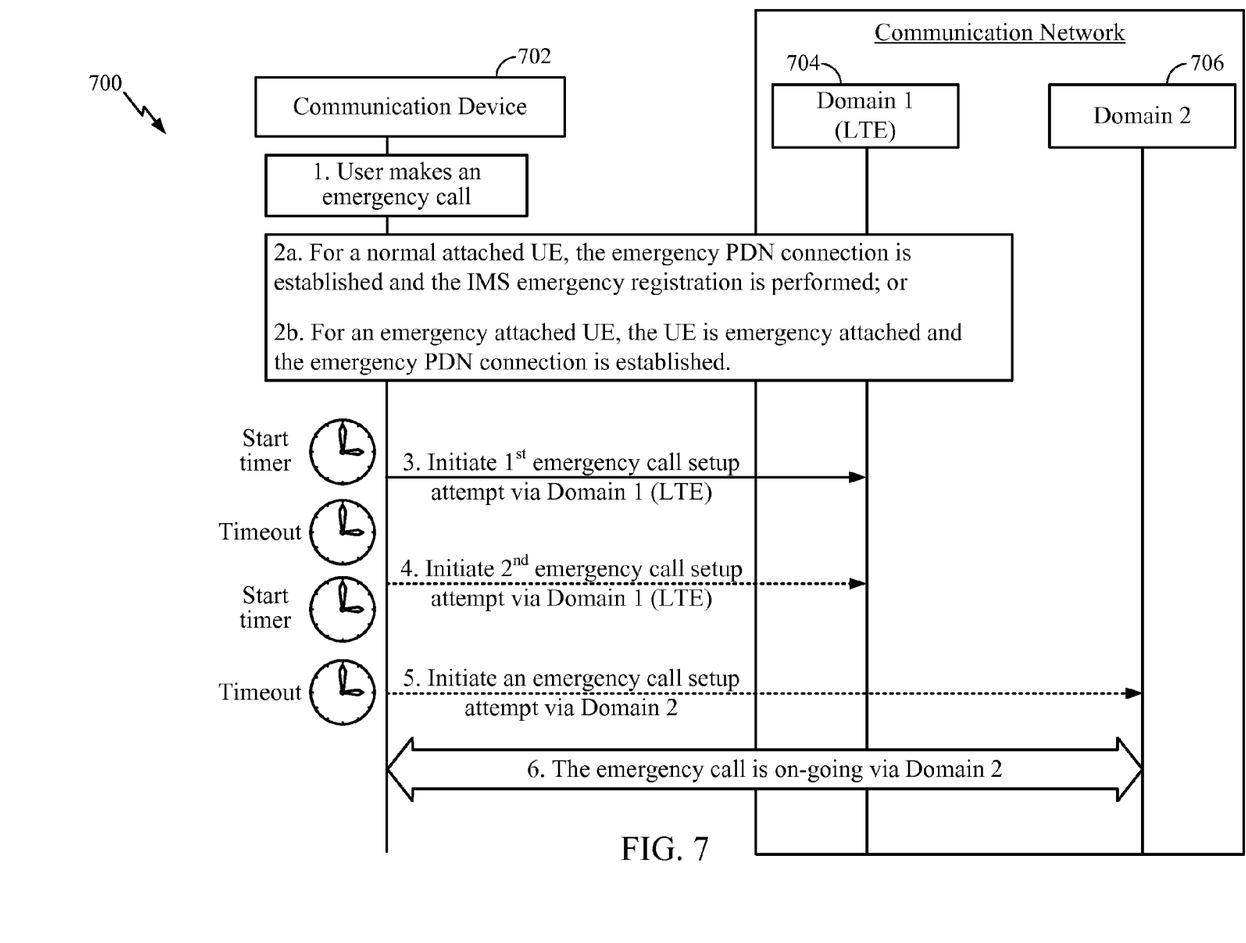
FIG. 7 illustrates an example of reducing a number of call setup attempts during an emergency call setup phase, according to aspects of the present disclosure.

FIG. 7 illustrates an example call-flow diagram 700 for reducing a number of call setup attempts during an emergency call setup phase, according to aspects of the present disclosure. Similar to FIG. 6, the communication device 702 (e.g., multi-mode UE 350 of FIG. 3) may be capable of making an emergency call over two or more communication domains 704 and 706 (e.g., PS domain via LTE network, CS domain via UMTS, GSM or 1×RTT, and/or DSL via PSTN).

The communication device 702 may be attached to or camped on a first communication domain 704 (e.g., LTE). In an overloaded network scenario, however, the device 702 may not be successfully attached to the communication network.

At Step 1, the communication device 702 may make an emergency call. At Step 2a, for a normal attached communication device, the emergency PDN connection may be established and the IMS emergency registration may be performed. Alternatively, at Step 2b, for an emergency attached communication device, the UE may be emergency attached and the emergency PDN connection may be established.

After establishing an emergency PDN connection via Domain 1 704 (e.g., LTE) at Step 3, the device 702 may measure a first time period upon a first call setup attempt via Domain 1. At Step 4, the first call setup attempt via Domain 1 704 may fail due to expiration of the first time period. Accordingly, the UE may measure second time period upon a retry of initiating the call setup attempt via Domain 1.

At Step 5, the second call setup attempt via Domain 1 704 may fail due expiration of the second time period. A configurable parameter may be used to determine the number of times a communication device may retry the call setup attempt in Domain 1 704. For example, if the configurable parameter indicates one retry in Domain 1, after Step 5, the communication device may switch to another available domain (e.g., Domain 2 706) to attempt the emergency call setup.

At Step 6, the emergency call setup may be successful via Domain 2. Accordingly, the emergency call may be on-going via Domain 2.

According to aspects of the present disclosure, if an attempt of initiating the emergency call setup via Domain 2 fails, the communication device may switch to another available domain (e.g., not illustrated) in an effort to make the emergency call.

As described above, the number of retries for attempting an emergency call setup in Domain 1 704 may be governed by a configurable parameter. The configurable parameter may be based on the emergency call setup time deployment requirements. The scenario described with reference to FIG. 7 illustrates retrying in Domain 1 one time prior to switching to another available network.

Additionally or alternatively, the above-mentioned limited number of retries for IMS emergency calls may also apply to other UE-procedures including, for example, initiating PDN connection establishment and/or performing IMS emergency registration in the first RAT.

Figure 8:
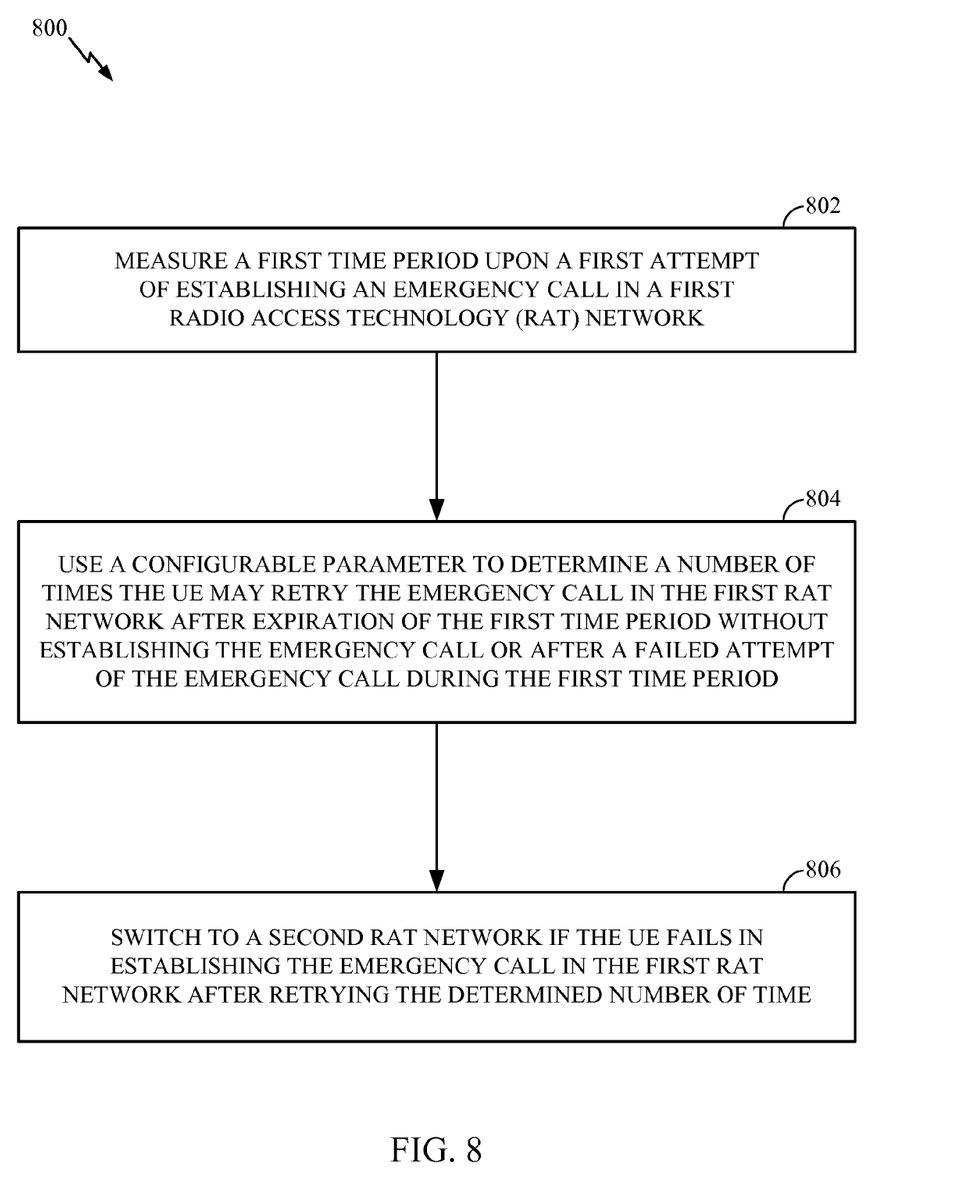
FIG. 8 illustrates operations, performed for example, by a multi-mode UE, in an effort to increase the emergency call success rate, according to aspects of the present disclosure.

FIG. 8 illustrates example operations 800 for limiting the number of retries for certain procedures during an emergency call, according to aspects of the present disclosure. The operations 800 may be performed, for example, by a multi-mode UE, such as UE 350 of FIG. 3, communication device 602 of FIG. 6, and/or communication device 702 of FIG. 7.

At 802, the UE may measure a first time period upon a first attempt (e.g., procedure attempt) of establishing an emergency call in a first RAT network. At 804, the UE may use a configurable parameter to determine a number of times the UE may retry the emergency call (e.g., retry the procedure attempt) in the first RAT network after expiration of the first time period without establishing the emergency call or after a failed attempt of the emergency call during the first time period. At 806, the UE may switch to a second RAT network if the UE fails in establishing the emergency call in the first RAT network after retrying the determined number of times.

As described herein, and as illustrated in FIG. 6, the first attempt of establishing the emergency call may comprise initiating an attach attempt with the first RAT network. Initiating the attach attempt may include performing an emergency attach procedure with the first RAT network. As illustrated in FIG. 7, the first attempt of establishing the emergency call may comprise initiating an emergency call setup attempt in the first RAT network. According to aspects, the first attempt of establishing the emergency call may comprise initiating an emergency PDN connection establishment and/or performing IMS emergency registration in the first RAT.

As described above, the UE may determine an expiration of the first time period without establishing the emergency call or a failed first attempt of the emergency call during the first time period and may measure a second time period upon a first retry of the emergency call in the first RAT network. In certain aspects, the UE may determine an expiration of the second time period without establishing the emergency call or a failed first retry of the emergency call during the second time period. The first time period may be equal to or different than the second time period. For example, the second time period may be greater than the first time period.

According to aspects, one or more of the first and second time periods may be based on a maximum number of SIP invite requests. For example, one or more of the first and second time periods may be based on a time requests to send less than a configured maximum allowed number of SIP invite request messages.

Thus, aspects of the present disclosure may limit the number of retries for some procedures while placing an emergency call. Accordingly, aspects presented herein may improve the success rate and decrease call setup time for making an emergency call in overloaded network.

As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications by a multi-mode user equipment (UE), comprising:
   measuring a first time period during a first attempt of establishing an emergency call in a first radio access technology (RAT) network;
   using a configurable parameter to determine a number of times the UE may retry the emergency call in the first RAT network after expiration of the first time period without establishing the emergency call or after a failed attempt of the emergency call during the first time period;
   measuring a second time period during a first retry of the emergency call in the first RAT network, wherein the first and second time periods are based on a time required to send less than a configured maximum number of retries for a normal call; and
   switching to a second RAT network if the UE fails in establishing the emergency call in the first RAT network after retrying the determined number of times.

2. The method of claim 1, further comprising:
   determining at least one of an expiration of the first time period without establishing the emergency call or a failed first attempt of the emergency call during the first time period.

3. The method of claim 1, further comprising:
   determining at least one of an expiration of the second time period without establishing the emergency call or a failed first retry of the emergency call during the second time period.

4. The method of claim 1 wherein the first time period is equal to the second time period.

5. The method of claim 1, wherein the first time period is different than the second time period.

6. The method of claim 5, wherein the second time period is greater than the first time period.

7. The method of claim 1, wherein one or more of the first and second time periods are based on at least one timer.

8. The method of claim 1, wherein one or more of the first and second time periods are based on a time required to send less than a configured maximum allowed number of Session Initiated Protocol (SIP) Invite request messages.

9. The method of claim 1, wherein the configurable parameter indicates that the UE may retry the emergency call in the first RAT network one time.

10. The method of claim 1, wherein the first attempt of the emergency call comprises initiating an attach attempt with the first RAT network.

11. The method of claim 10, wherein the first attempt of the emergency call comprises performing an emergency attach procedure with the first RAT network.

12. The method of claim 1, wherein:
   the UE is camped on the first RAT network; and
   the first attempt of the emergency call comprises initiating an attach attempt or performing an emergency attach procedure with the first RAT network.

13. The method of claim 1, further comprising:
   establishing an emergency packet data network (PUN) connection in the first RAT network prior to measuring the first time period.

14. The method of claim 13, further comprising:
   performing Internet Protocol Multimedia Subsystem (IMS) emergency registration in the first RAT network prior to measuring the first time period.

15. The method of claim 14, wherein the first attempt of establishing the emergency call comprises initiating an emergency call setup attempt in the first RAT network.

16. The method of claim 1, further comprising:
   performing Internet Protocol Multimedia Subsystem (IMS) emergency registration in the first RAT network prior to measuring the first time period.

17. The method of claim 16, wherein the first attempt of establishing the emergency call comprises initiating an emergency call setup attempt in the first RAT network.

18. The method of claim 1, wherein the first attempt of establishing the emergency call comprises at least one of: initiating emergency packet data network (PDN) connection establishment or performing Internet Protocol Multimedia Subsystem (IMS) emergency registration in the first RAT.

19. A multi-mode user equipment (UE), comprising:
means for measuring a first time period during a first attempt of establishing an emergency call in a first radio access technology (RAT) network;
means for using a configurable parameter to determine a number of times the UE may retry the emergency call in the first RAT network after expiration of the first time period without establishing the emergency call or after a failed attempt of the emergency call during the first time period;
means for measuring a second time period during a first retry of the emergency call in the first RAT network, wherein the first and second time periods are based on a time required to send less than a configured maximum number of retries for a normal call; and
means for switching to a second RAT network if the UE fails in establishing the emergency call in the first RAT network after retrying the determined number of times.

20. The multi-mode UE of claim 19, further comprising:
means for determining at least one of an expiration of the first time period without establishing the emergency call or a failed first attempt of the emergency call during the first time period.

21. The multi-mode UE of claim 19, further comprising:
means for determining at least one of an expiration of the second time period without establishing the emergency call or a failed first retry of the emergency call during the second time period.

22. The multi-mode UE of claim 19, wherein the first time period is equal to the second time period.

23. The multi-mode UE of claim 19, wherein the first time period is different than the second time period.

24. The multi-mode UE of claim 23, wherein the second time period is greater than the first time period.

25. The multi-mode UE of claim 19, wherein one or more of the first and second time periods are based on at least one timer.

26. The multi-mode UE of claim 19, wherein one or more of the first and second time periods are based on a time required to send less than a configured maximum allowed number of Session Initiated Protocol (SIP) Invite request messages.

27. The multi-mode UE of claim 19, wherein the configurable parameter indicates that the UE may retry the emergency call in the first RAT network one time.

28. The multi-mode UE of claim 19, wherein the first attempt of the emergency call comprises initiating an attach attempt with the first RAT network.

29. The multi-mode HE of claim 28, wherein the first attempt of the emergency call comprises performing an emergency attach procedure with the first RAT network.

30. The multi-mode UE of claim 19, wherein:
the HE is camped on the first RAT network; and
the first attempt of the emergency call comprises means for initiating an attach attempt or performing an emergency attach procedure with the first RAT network.

31. The multi-mode HE of claim 19, further comprising:
means for establishing an emergency packet data network (PDN) connection in the first RAT network prior to measuring the first time period.

32. The multi-mode HE of claim 31, further comprising:
means for performing Internet Protocol Multimedia Subsystem (IMS) emergency registration in the first RAT network prior to measuring the first time period.

33. The multi-mode UE of claim 32, wherein the first attempt of establishing the emergency call comprises initiating an emergency call setup attempt in the first RAT network.

34. The multi-mode UE of claim 19, further comprising:
means for performing Internet Protocol Multimedia Subsystem (IMS) emergency registration in the first RAT network prior to measuring the first tune period.

35. The multi-mode UE of claim 34, wherein the first attempt of establishing the emergency call comprises initiating an emergency call setup attempt in the first RAT network.

36. The multi-mode UE of claim 19, wherein the first attempt of establishing the emergency call comprises at least one of: means for initiating emergency packet data network (PDN) connection establishment or means for performing Internet Protocol Multimedia Subsystem (IMS) emergency registration in the first RAT.

37. An apparatus for wireless communications by a multi-mode user equipment (UE), comprising:
at least one processor configured to:
measure a first time period during a first attempt of establishing an emergency call in a first radio access technology (RAT) network;
use a configurable parameter to determine a number of times the UE may retry the emergency call in the first RAT network after expiration of the first time period without establishing the emergency call or after a failed attempt of the emergency call during the first time period;
measure a second time period during a first retry of the emergency call in the first RAT network, wherein the first and second time periods are based on a time required to send less than a configured maximum number of retries for a normal call; and
switch to a second RAT network if the UE fails in establishing the emergency call in the first RAT network after retrying the determined number of times; and
a memory coupled to the at least one processor.

38. The apparatus of claim 37, wherein the at least one processor is further configured to:
determine at least one of an expiration of the first time period without establishing the emergency call or a failed first attempt of the emergency call during the first time period.

39. The apparatus of claim 37, wherein the at least one processor is further configured to:
determine at least one of an expiration of the second time period without establishing the emergency call or a failed first retry of the emergency call during the second time period.

40. The apparatus of claim 37, wherein the first time period is equal to the second time period.

41. The apparatus of claim 37, wherein the first time period is different than the second time period.

42. The apparatus of claim 41, wherein the second time period is greater than the first time period.

43. The apparatus of claim 37, wherein one or more of the first and second time periods are based on at least one timer.

44. The apparatus of claim 37, wherein one or more of the first and second time periods are based on a time required to send less than a configured maximum allowed number of Session Initiated Protocol (SIP) Invite request messages.

45. The apparatus of claim 37, wherein the configurable parameter indicates that the UE may retry the emergency call in the first RAT network one time.

46. The apparatus of claim 37, wherein the first attempt of the emergency call comprises initiating an attach attempt with the first RAT network.

47. The apparatus of claim 46, wherein the first attempt of the emergency call comprises performing an emergency attach procedure with the first RAT network.

48. The apparatus of claim 37, wherein:
the UE is camped on the first RAT network; and
the first attempt of the emergency call comprises initiating an attach attempt or performing an emergency attach procedure with the first RAT network.

49. The apparatus of claim 37, wherein the at least one processor is further configured to:
establish an emergency packet data network (PDN) connection in the first RAT network prior to measuring the first time period.

50. The apparatus of claim 49, wherein the at least one processor is further configured to:
perform Internet Protocol Multimedia Subsystem (IMS) emergency registration in the first RAT network prior to measuring the first time period.

51. The apparatus of claim 50, wherein the first attempt of establishing the emergency call comprises initiating an emergency call setup attempt in the first RAT network.

52. The apparatus of claim 37, wherein the at least one processor is further configured to:
perform Internet Protocol Multimedia Subsystem (IMS) emergency registration in the first RAT network prior to measuring the first time period.

53. The apparatus of claim 52, wherein the first attempt of establishing the emergency call comprises initiating an emergency call setup attempt in the first RAT network.

54. The apparatus of claim 37, wherein the first attempt of establishing the emergency call comprises at least one of: initiating emergency packet data network (PDN) connection establishment or performing Internet Protocol Multimedia Subsystem (IMS) emergency registration in the first RAT.

55. A non-transitory computer-readable medium for wireless communications by a multi-mode user equipment (UE), the non-transitory computer-readable medium having code stored thereon, the code executable by one or more processors for:
measuring a first time period during a first attempt of establishing an emergency call in a first radio access technology (RAT) network;
using a configurable parameter to determine a number of times the UE may retry the emergency call in the first RAT network after expiration of the first time period without establishing the emergency call or after a failed attempt of the emergency call during the first time period;
measuring a second time period upon a first retry of the emergency call in the first RAT network, wherein the first and second time periods are based on a time required to send less than a configured maximum number of retries for a normal call; and
switching to a second RAT network if the UE fails in establishing the emergency call in the first RAT network after retrying the determined number of times.

56. The non-transitory computer-readable medium of claim 55, further comprising:
code for determining at least one of an expiration of the first time period without establishing the emergency call or a failed first attempt of the emergency call during the first time period.

57. The non-transitory computer-readable medium of claim 55, further comprising:
code for determining at least one of an expiration of the second time period without establishing the emergency call or a failed first retry of the emergency call during the second time period.

58. The non-transitory computer-readable medium of claim 55, wherein the first time period is equal to the second time period.

59. The non-transitory computer-readable medium of claim 55, wherein the first time period is different than the second time period.

60. The non-transitory computer-readable medium of claim 59, wherein the second time period is greater than the first time period.

61. The non-transitory computer-readable medium of claim 55, wherein one or more of the first and second time periods are based on at least one timer.

62. The non-transitory computer-readable medium of claim 55, wherein one or more of the first and second time periods are based on a time required to send less than a configured maximum allowed number of Session Initiated Protocol (SIP) invite request messages.

63. The non-transitory computer-readable medium of claim 55, wherein the configurable parameter indicates that the UE may retry the emergency call in the first RAT network one time.

64. The non-transitory computer-readable medium of claim 55, wherein the first attempt of the emergency call comprises initiating an attach attempt with the first RAT network.

65. The non-transitory computer-readable medium of claim 64, wherein the first attempt of the emergency call comprises performing an emergency attach procedure with the first RAT network.

66. The non-transitory computer-readable medium of claim 55, wherein:
the UE is camped on the first RAT network; and
the first attempt of the emergency call comprises initiating an attach attempt or performing an emergency attach procedure with the first RAT network.

67. The non-transitory computer-readable medium of claim 55, further comprising:
code for establishing an emergency packet data network (PDN) connection in the first RAT network prior to measuring the first time period.

68. The non-transitory computer-readable medium of claim 67, further comprising:
code for performing Internet Protocol Multimedia Subsystem (IMS) emergency registration in the first RAT network prior to measuring the first time period.

69. The non-transitory computer-readable medium of claim 68, wherein the first attempt of establishing the emergency call comprises initiating an emergency call setup attempt in the first RAT network.

70. The non-transitory computer-readable medium of claim 55, further comprising:
performing Internet Protocol Multimedia Subsystem (IMS) emergency registration in the first RAT network prior to measuring the first time period.

71. The non-transitory computer-readable medium of claim 70, wherein the first attempt of establishing the emergency call comprises initiating an emergency call setup attempt in the first RAT network.

72. The non-transitory computer-readable medium of claim 55, wherein the first attempt of establishing the emergency call comprises at least one of: initiating emergency packet data network (PDN) connection establishment or performing Internet Protocol Multimedia Subsystem (IMS) emergency registration in the first RAT.

* * * * *